United States Patent
Yuan et al.

(10) Patent No.: US 12,347,222 B2
(45) Date of Patent: Jul. 1, 2025

(54) VISUALIZATION OF THE IMPACT OF TRAINING DATA USING BOUNDING BOX VECTORS TO TRAIN A MACHINE LEARNING MODEL

(71) Applicant: International Business Machines Corporation, Armonk, NY (US)

(72) Inventors: Zhong Fang Yuan, Xi'an (CN); Tong Liu, Xi'an (CN); Pitipong Jun Sen Lin, Cambridge, MA (US); Elaine Marie Branagh, Austin, TX (US); Chen Yu Chang, Xi'an (CN)

(73) Assignee: International Business Machines Corporation, Armonk, NY (US)

(*) Notice: Subject to any disclaimer, the term of this patent is extended or adjusted under 35 U.S.C. 154(b) by 535 days.

(21) Appl. No.: 17/586,343

(22) Filed: Jan. 27, 2022

(65) Prior Publication Data
US 2023/0237827 A1   Jul. 27, 2023

(51) Int. Cl.
| | |
|---|---|
| *G06V 30/414* | (2022.01) |
| *G06V 30/19* | (2022.01) |
| *G06V 30/412* | (2022.01) |
| *G06V 30/418* | (2022.01) |
| *G06V 10/82* | (2022.01) |

(52) U.S. Cl.
CPC ...... *G06V 30/412* (2022.01); *G06V 30/19013* (2022.01); *G06V 30/414* (2022.01); *G06V 30/418* (2022.01)

(58) Field of Classification Search
CPC ...... G06V 10/82; G06V 10/945; G06V 10/95; G06V 30/1473; G06V 30/19013; G06V 30/412; G06V 30/414; G06V 30/418
USPC .......................................................... 382/175
See application file for complete search history.

(56) References Cited

U.S. PATENT DOCUMENTS

| | | | |
|---|---|---|---|
| 7,152,786 B2 | 12/2006 | Brundage et al. | |
| 8,781,925 B1 | 7/2014 | Stone et al. | |
| 8,977,057 B1 | 3/2015 | Smith | |
| 10,007,865 B1* | 6/2018 | Kim | G06V 10/82 |
| 10,699,112 B1* | 6/2020 | Corcoran | G06F 16/313 |
| 10,872,236 B1* | 12/2020 | Elor | G06V 30/1452 |
| 11,010,738 B2 | 5/2021 | Miller | |
| 11,836,160 B1* | 12/2023 | Xia | G06N 20/00 |

(Continued)

FOREIGN PATENT DOCUMENTS

CN   107480680 A   12/2017

OTHER PUBLICATIONS

Hazoom, Word2Vec For Phrases—Learning Embeddings For More Than One Word, Towards Data Science, Dec. 23, 2018, https://towardsdatascience.com/word2vec-for-phrases-learning-embeddings-for-more-than-one-word-727b6cf723cf.

(Continued)

*Primary Examiner* — Chad Dickerson
(74) *Attorney, Agent, or Firm* — Harrity & Harrity, LLP

(57) ABSTRACT

An example operation may include one or more of generating a plurality of bounding boxes at a plurality of content areas in an image corresponding to a plurality of pieces of text within the image, converting the plurality of bounding boxes into a plurality of bounding box vectors based on attributes of the plurality of bounding boxes, training a machine learning model to transform a bounding box into a location in vector space based on the plurality of bounding box vectors, and storing the trained machine learning model in memory.

18 Claims, 14 Drawing Sheets

(56) References Cited

U.S. PATENT DOCUMENTS

| | | | | |
|---|---|---|---|---|
| 2017/0061294 | A1* | 3/2017 | Weston | G06N 3/045 |
| 2021/0365677 | A1* | 11/2021 | Anzenberg | G06N 3/045 |
| 2021/0383107 | A1* | 12/2021 | Li | G06V 30/414 |
| 2023/0186668 | A1* | 6/2023 | Dong | G06F 40/114 |
| | | | | 382/176 |

OTHER PUBLICATIONS

Anonymous, Oracle® Fusion Applications Financials Implementation Guide, Mar. 2013, Oracle, https://docs.oracle.com/cd/E36909_01/fusionapps.1111/e20375/F569958AN60E65.htm, pp. 1015-1028.

Appalaraju et al., DocFormer: End-to-End Transformer for Document Understanding, ARXIV, Jun. 22, 2021.

Cabuz, Receipt and Invoice AI—Now available in Public Preview!, UiPath Community Forrum, Jun. 2019, https://forum.uipath.com/t/receipt-and-invoice-ai-now-available-in-public-preview/125056.

Jazoom, Word2Vec for Phrases—Learning Embeddings for More Than One Word, Towards Data Science, Dec. 23, 2018, https://towardsdatascience.com/word2vec-for-phrases-learning-embeddings-for-more-than-one-word-727b6cf723cf.

Patel et al., Abstractive Information Extraction from Scanned Invoices (AIESI) using End-to-end Sequential Approach, Research Gate, Sep. 2020.

Sun et al., Template Matching-Based Method for Intelligent Invoice Information Identification, IEEE Access, Feb. 27, 2019.

Zhang et al., TRIE: End-to-End Text Reading and Information Extraction for Document Understanding, ResearchGate, May 2020.

\* cited by examiner

Invoice # 1 — 210

- 220
- 221 — Date: 01-12-2022
- 222

To: Company A
115 West 23rd St.
Boulder, CO 80314

From: Company B
77 Grandview Dr.
Colorado Spring, CO 80314

Invoice No. US-01022

| Item ID | Quantity | Description | Cost |
|---------|----------|-------------|------|
| 10-221  | 25       | Auto Batteries | $45 |
| 44-011  | 5        | Head Units  | $400 |

- 223
- 224
- 225

Item Cost = $3125.00
Tax = $187.50

Total = $3312.50

(Payment Due in 30 Days)

Common ?

Invoice # 2 — 230

- 232

Company A
115 West 23rd St.
Boulder, CO 80314

Re Invoice No. US-01022
Date: 01-12-2022

- 231
- 233 — Batteries (25 at $45.00) = $1,125.00
- 234 — Head Units (4 at $400.00) = $2,000.00

Total = $3312.50 — 235

–"Paid in Full"–

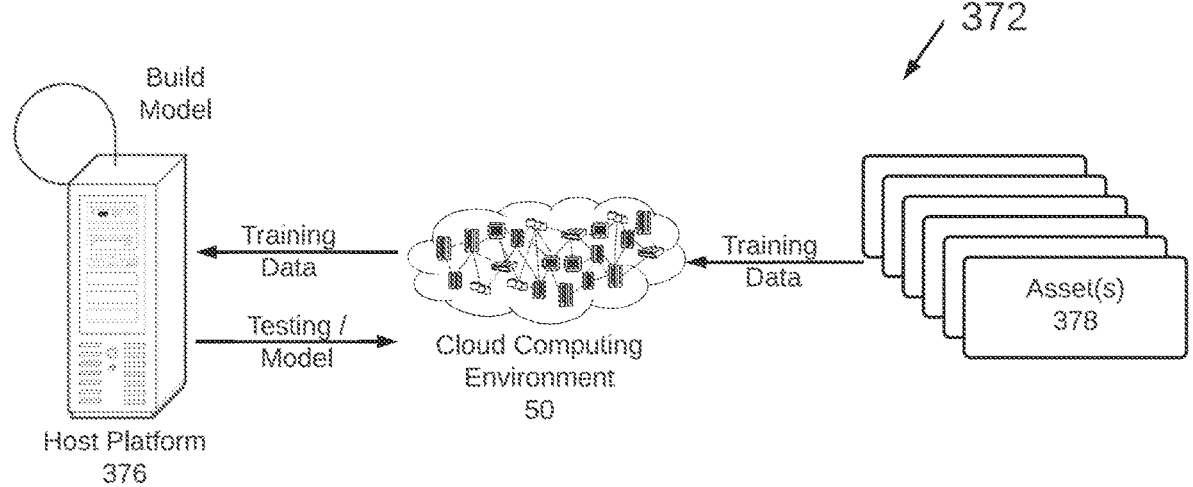
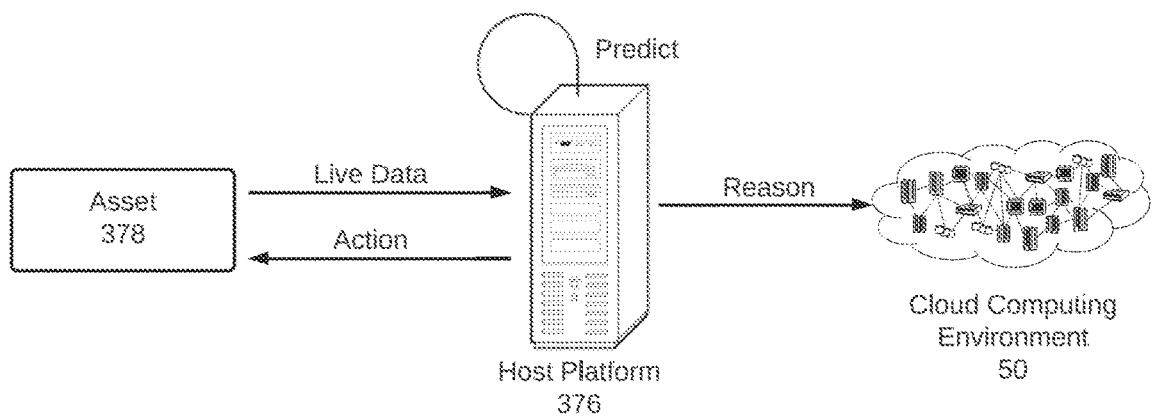
FIG. 3D

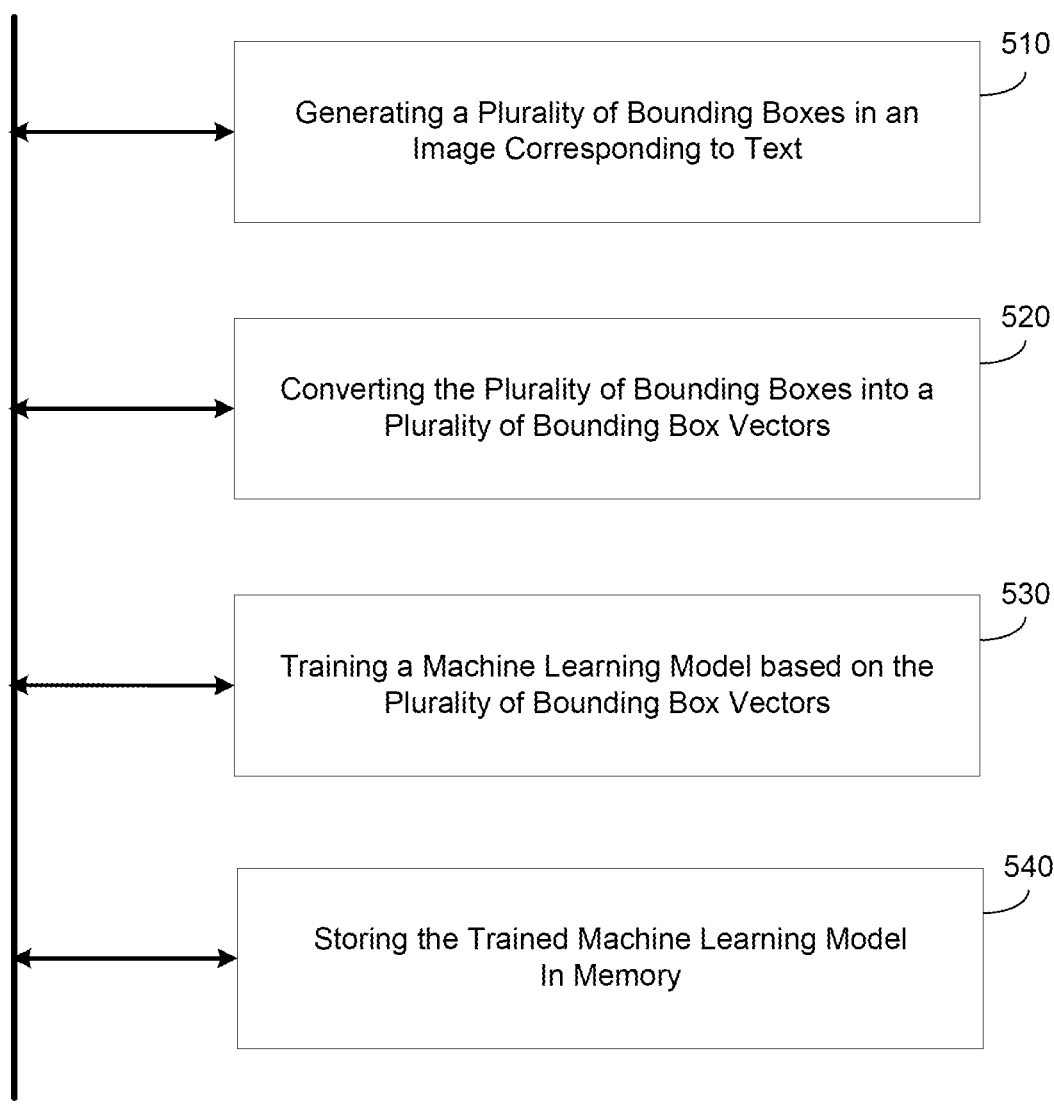

VISUALIZATION OF THE IMPACT OF TRAINING DATA USING BOUNDING BOX VECTORS TO TRAIN A MACHINE LEARNING MODEL

BACKGROUND

Organizations may use multiple different software systems to carry out various enterprise data management (EDM) functions including, but not limited to, accounting, invoicing, ordering, supply chain management, and the like. These different systems are usually provided by different providers. As a result, there is often a lack of consistency among the documents created by these systems including differences in format, semantic content, images, etc. For example, the same invoice generated by two different systems (e.g., accounting and supply chain management, etc.) may include different colored backgrounds, different shading, different alphanumeric content (words, numbers text, etc.), different formats, and the like. At first glance, it may be difficult for a person, let alone a computer, to identify whether such documents refer to the same thing or include similar content as each other.

SUMMARY

One example embodiment provides an apparatus that includes a memory configured to store an image, and a processor configured to one or more of generate a plurality of bounding boxes at a plurality of content areas in the image which correspond to a plurality of pieces of text within the image, convert the plurality of bounding boxes into a plurality of bounding box vectors based on attributes of the plurality of bounding boxes, train a machine learning model to transform a bounding box into a location in vector space based on the plurality of bounding box vectors, and store the trained machine learning model in the memory.

Another example embodiment provides a method that includes one or more of generating a plurality of bounding boxes at a plurality of content areas in an image corresponding to a plurality of pieces of text within the image, converting the plurality of bounding boxes into a plurality of bounding box vectors based on attributes of the plurality of bounding boxes, training a machine learning model to transform a bounding box into a location in vector space based on the plurality of bounding box vectors, and storing the trained machine learning model in memory.

A further example embodiment provides a computer-readable medium comprising instructions, that when read by a processor, cause the processor to perform one or more of generating a plurality of bounding boxes at a plurality of content areas in an image corresponding to a plurality of pieces of text within the image, converting the plurality of bounding boxes into a plurality of bounding box vectors based on attributes of the plurality of bounding boxes, training a machine learning model to transform a bounding box into a location in vector space based on the plurality of bounding box vectors, and storing the trained machine learning model in memory.

BRIEF DESCRIPTION OF THE DRAWINGS

FIG. 2B is a diagram illustrating a process of determining whether two documents include common content via execution of a trained machine learning model according to an example embodiment.

FIG. 3D is a diagram illustrating machine learning process via a cloud computing platform according to an example embodiment.

FIG. 5 is a diagram illustrating a method of training a machine learning model to transform a bounding box into vector space according to an example embodiment.

DETAILED DESCRIPTION

Figure 1:
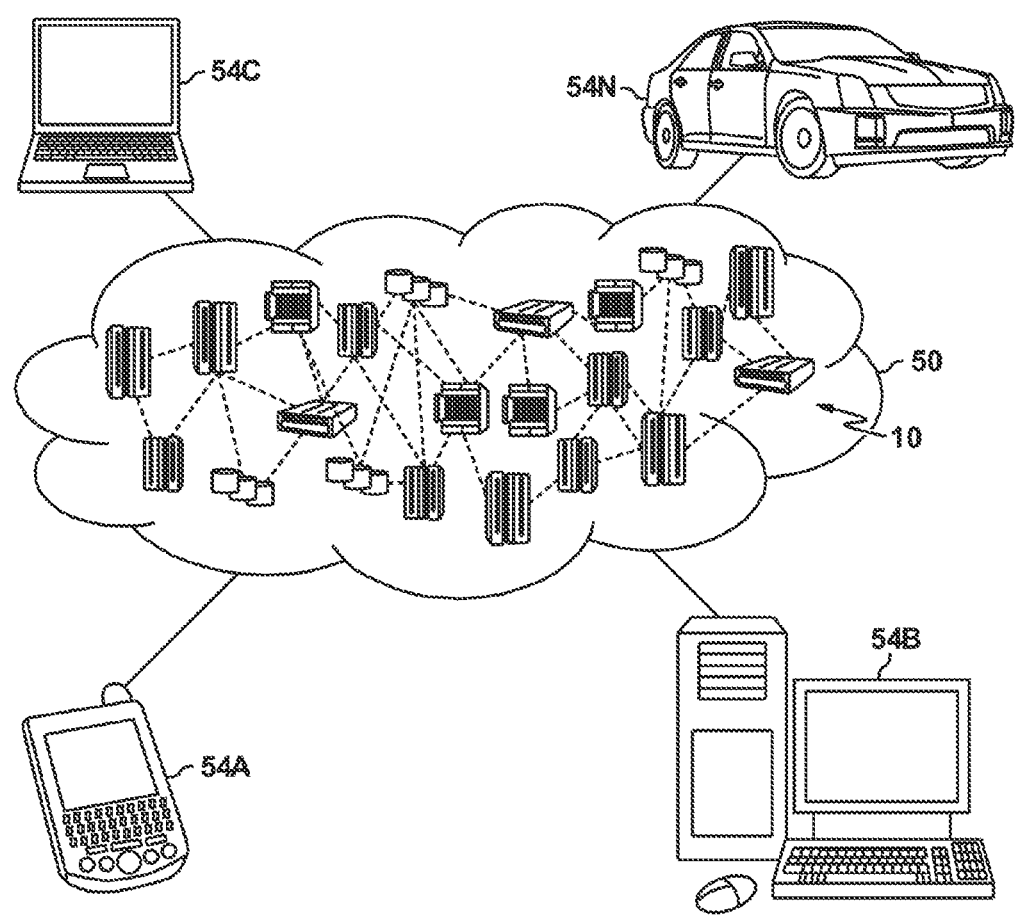
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

The example embodiments are directed to a model training environment, such as a cloud platform, web server, or other host, that may train and even use a machine learning model to compare the content of different documents (e.g., paper documents that have been scanned into an electronic document format, electronic documents, etc.) In particular, the machine learning model may convert bounding boxes into vector space (BBox2Vector Model). In some embodiments, the two document being compared may be directed to the same thing or may even be the same document, but the documents themselves may have different formats, colors, shades, data values, etc. This is common when organizations have multiple different document processing systems such as an accounting software, invoicing software, ordering software, enterprise data management (EDM) systems, and the like.

As just one example, each of an accounting software, an ordering software, and an EDM software may store a copy of an invoice, but with different formats. For a computer/software to match the invoices across the different systems can be difficult because the images/formats of the invoice do not look the same. For example, text values may be in different places or missing altogether. Additional or different text values, images, names, addresses, dates, etc. may be included in the different copies of the same invoice. Also, shadings, backgrounds, colors, and the like, may differ across the invoices. Furthermore, the effective content (e.g., the text) from the invoice may be filled in by different end users of the different systems. As a result, there may be not fixed or semantic content that is the same in each of the invoices.

Meanwhile, the relative position of the content (e.g., what its next to in the document) within each document may be similar rather than the absolute position of the content (e.g., pixel location, etc.). As just one example, the numerals "2022-01-21" may often be found close to the term/field "Date". This relative position information can be leveraged by the example embodiments when training the machine learning model.

The training process may be divided into two steps or processes. During a first step, bounding box vectors are created. Here, a corpus of documents may be gathered/collected. Here, the corpus may be two or more documents that are to be compared to each other, but embodiments are not limited thereto. The host may arrange bounding boxes within each document at locations of text content within each document. For example, the host platform may identify a plurality of pieces of alphanumeric content (e.g., words, numbers, strings, etc.) in the document and arrange a plurality of respective bounding boxes around the plurality of pieces of alphanumeric content. The process may be repeated for all documents.

Next, the host may convert each bounding box into a bounding box vector using multiple attributes (multi-modal information) of each bounding box. For example, a position of the bounding box within an image, the text content (e.g., semantic content) from the bounding box, and the image/background color within the bounding box may be embedded into a vector representation of the bounding box, referred to herein as the bounding box vector. In other words, a combination of position information, semantic information, and image information may be transformed into vector form using various models/algorithms such as described further below. Furthermore, the embedded position information, semantic information, and image information may be concatenated together within the vector, for example, using a fully connected neural network or the like.

During a second step, the host may use context around the bounding boxes along with the bounding box vectors to train a machine learning model to map a bounding box into vector space. The "context" may be the adjacent bounding boxes, and the corresponding bounding box vectors. In this step, the host may select an anchor bounding box (e.g., a first bounding box in the document, etc.) and identify the bounding boxes that are immediately adjacent in different directions, for example, one or more of above, below, left, and right. The host may then create a mapping between the anchor bounding box and the bounding box vectors of the immediately adjacent bounding boxes. In other words, the adjacent bounding boxes of the anchor bounding box can be used to represent the anchor bounding box in vector space.

The host may repeat this process for each of the bounding boxes in the document or documents, and continue to create these mappings between bounding boxes and adjacent bounding box vectors. Next, the host platform may use the mappings to iteratively train a machine learning model to map bounding boxes into vector space based on the mappings between bounding boxes and adjacent bounding box vectors. As an example, the machine learning model may be trained until it converges on a desired level of accuracy/performance. The trained machine learning model can then receive two different bounding boxes from two different documents, identify a location of the two different bounding boxes in vector space, and determine a similarity/difference between the locations of the two different bounding boxes in vector space (once converted). If the distance between the two bounding boxes in vector space is within a predetermined distance threshold, the host may determine that the two bounding boxes correspond to the same fields/semantic content. The more fields that are matched, the more confident the host can be that the two documents are directed to the same content.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
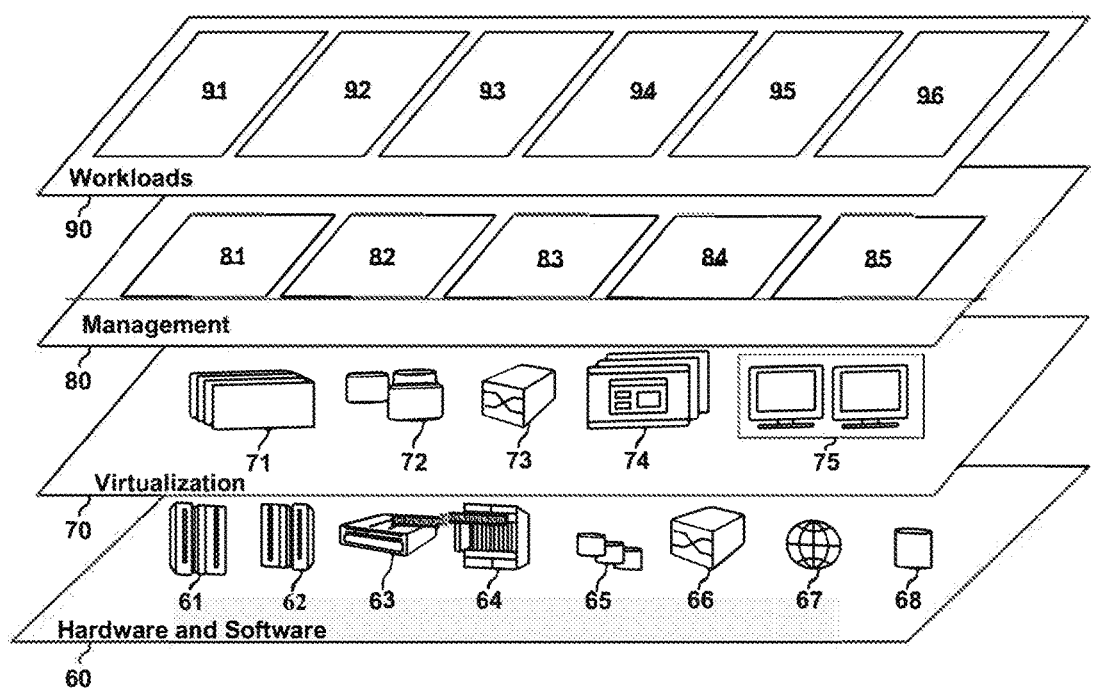
FIG. 2A is a diagram illustrating abstraction model layers of a cloud computing environment according to an example embodiment.

Referring now to FIG. 2A, a set of functional abstraction layers provided by cloud computing environment 50 FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a machine learning model training process 96.

FIG. 2B illustrates a process 210 of determining whether two documents include common content via execution of a trained machine learning model according to an example embodiment. For example, the cloud computing environment 50 (shown in FIG. 2A) may include a training platform for training machine learning models. In this example, the training may be performed via the machine learning model training process 96 which may be called by the host using various commands (e.g., via an API, an HTTP command, etc.) This trained machine learning model can then be used to determine whether a first document 210 includes the same content as a second document 220.

Referring to FIG. 2B, the first document 210 and the second document 220 correspond to a same invoice that is generated by different software systems. Some of the data is common across the first and second documents 210 and 220. For example, data items 221, 222, 223, 224, and 225 in the first document 210 are similar to data items 231, 232, 233, 234, and 235 in the second document 230. However, some of the data is different, including different/additional semantic content (alphanumeric characters), background shading, formats, and the like. Therefore, identifying that both of these documents refer to the same thing can be difficult.

The example embodiments train a machine learning model to arrange and extract bounding box content from the two documents 210 and 220 and compare it to each other in vector space. The examples of training such a machine learning model are further described below in the examples of FIGS. 4A-4E. An additional example of using the trained machine learning model is further described below in the example of FIG. 4F. Through this process, the host platform (such as the cloud computing environment 50) can be used to compare documents and determine whether they refer to the same content (e.g., the two documents are the same, the two documents refer to the same transaction, etc.)

FIGS. 3A-3E provide various examples of additional features that may be used in association with the cloud computing environment described herein. These examples should be considered as additional extensions or additional examples of the embodiments described herein.

Figure 3A:
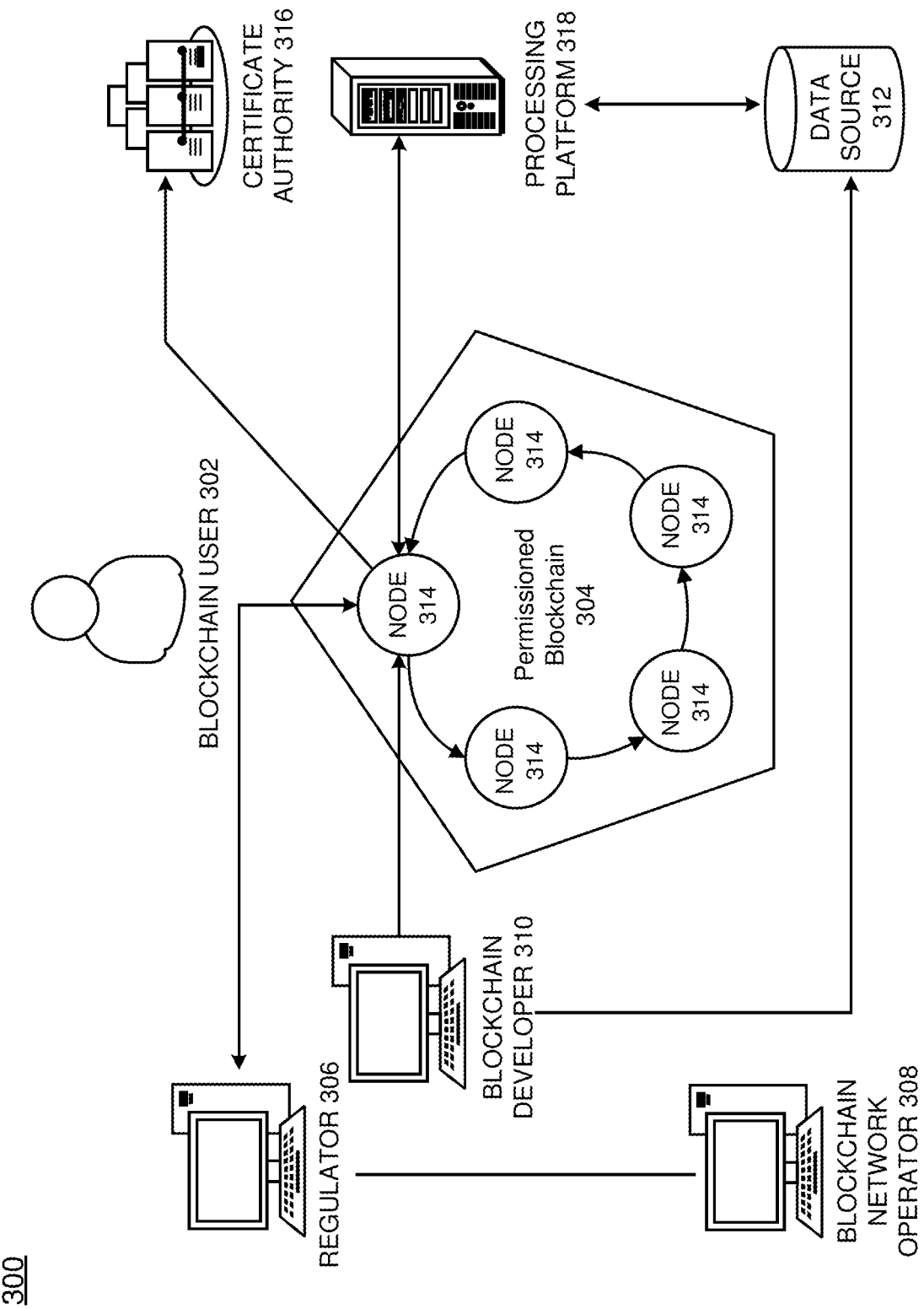
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
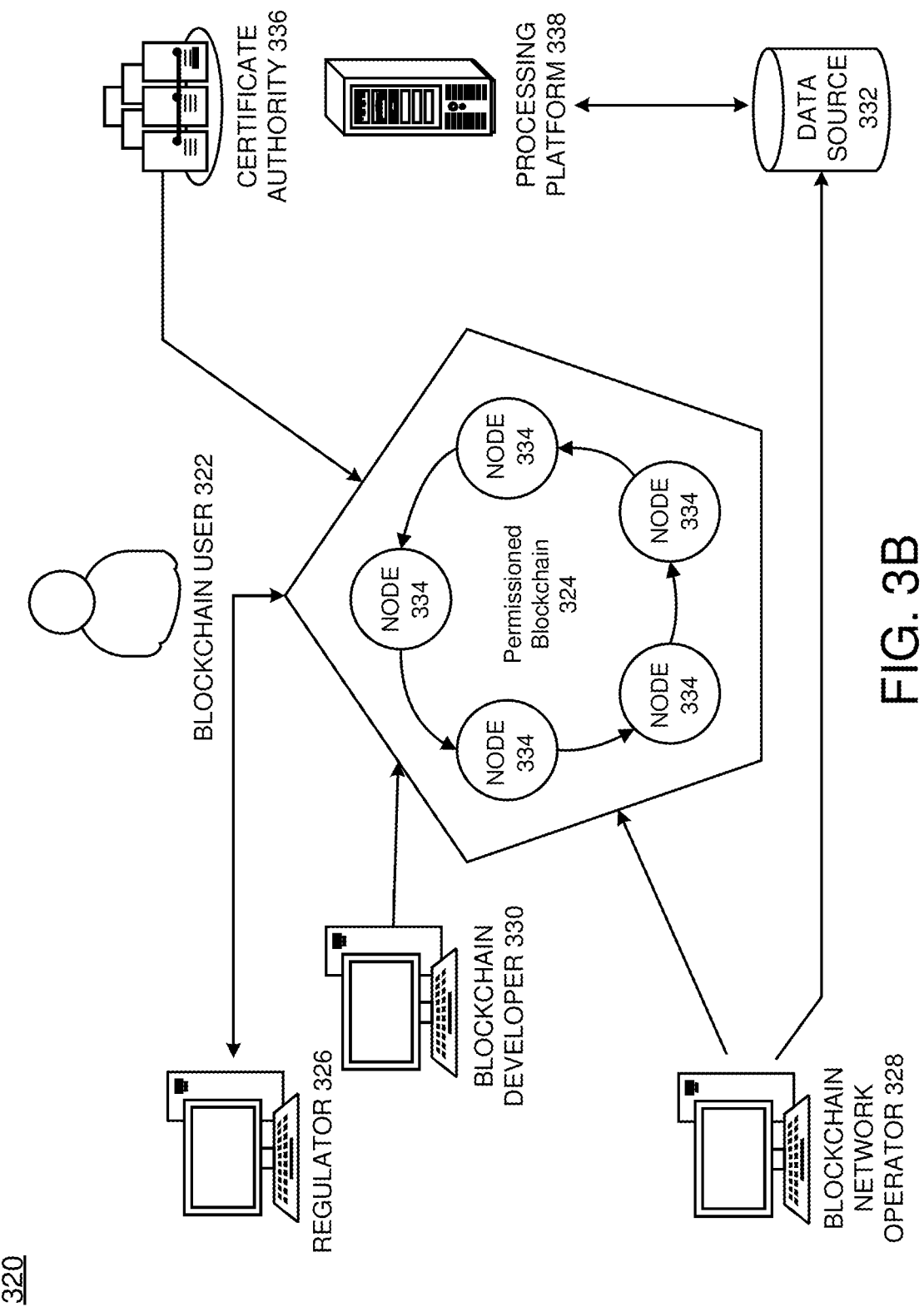

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
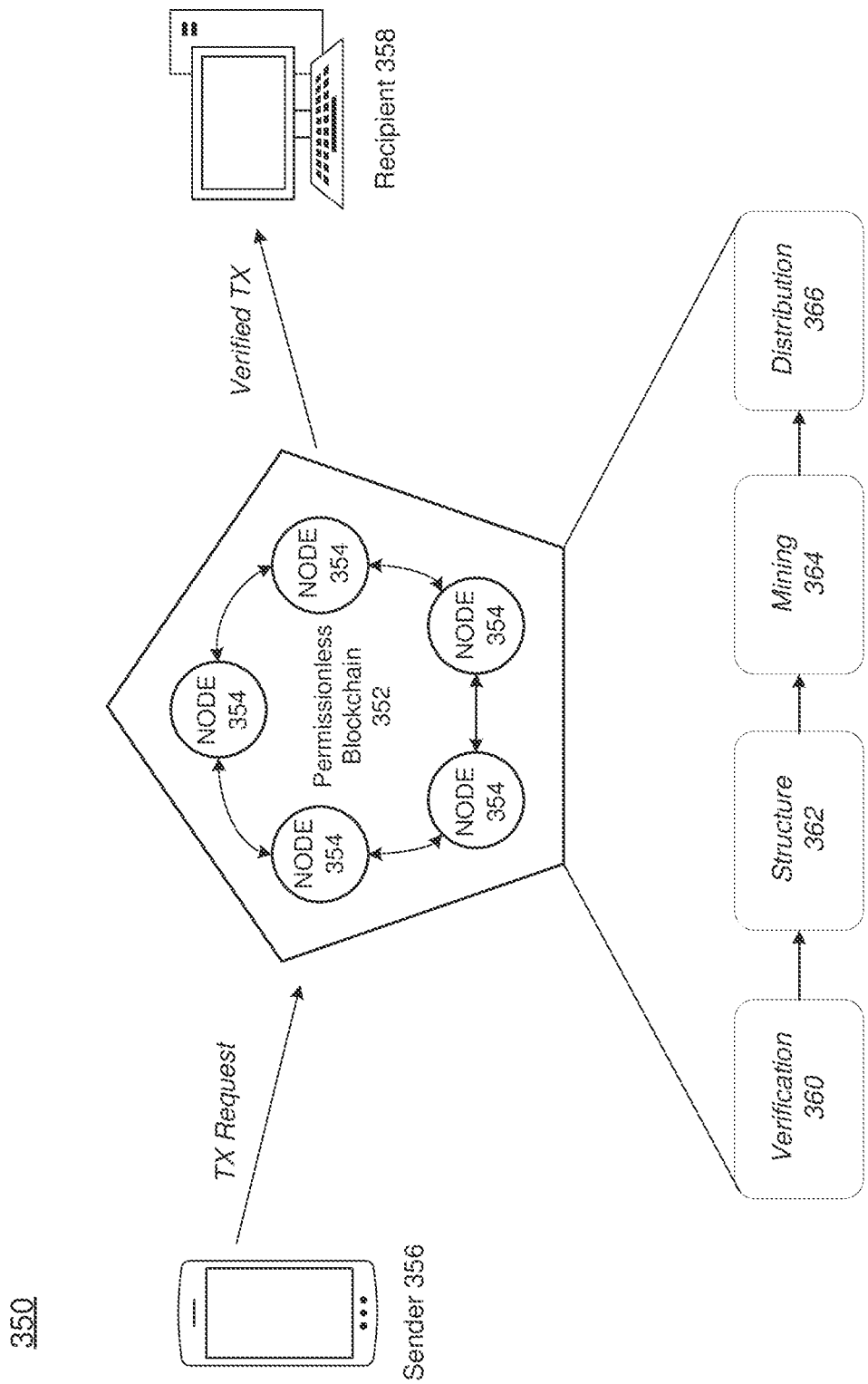

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3E:
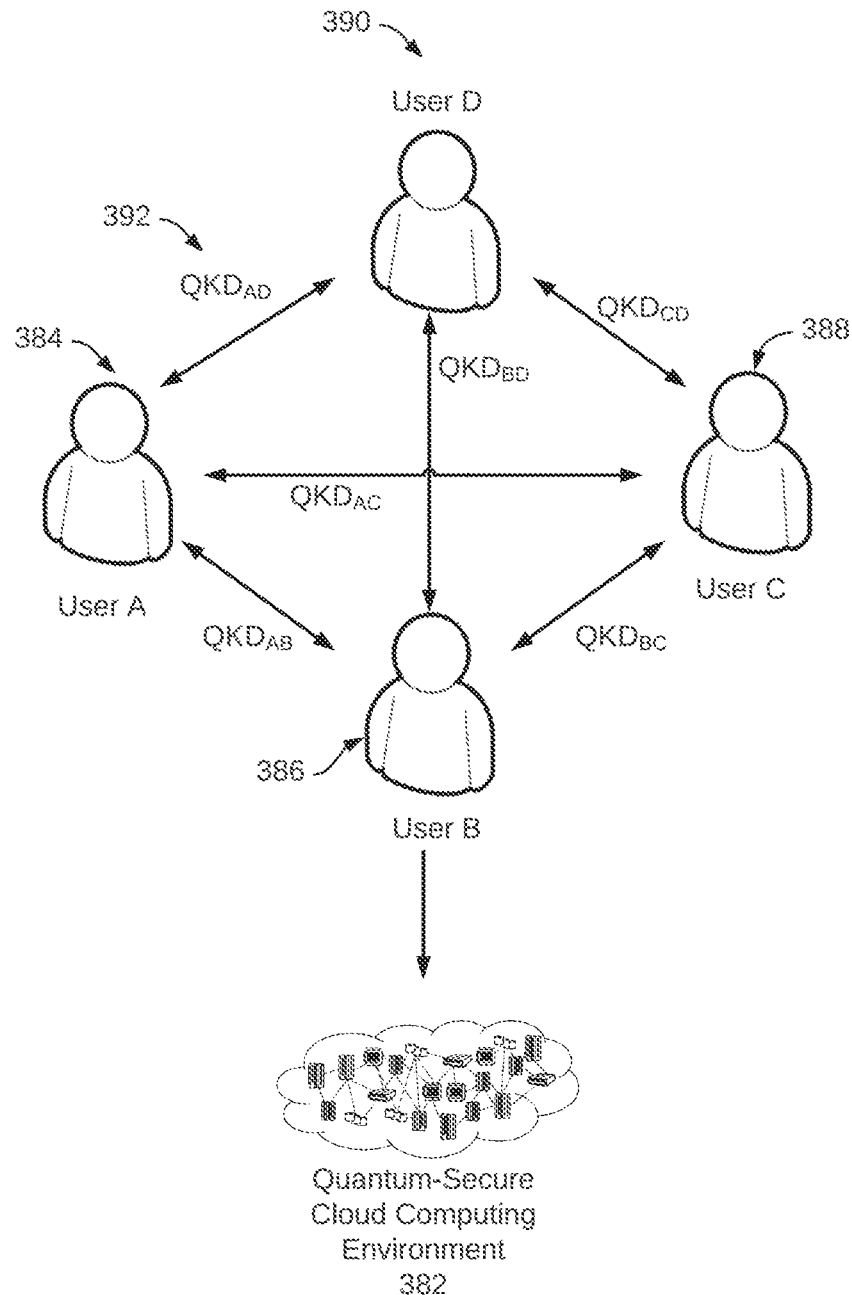
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including QKDAB, QKDAc, QKDAD, QKDBc, QKDBD, and QKDcD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

Figure 4A:
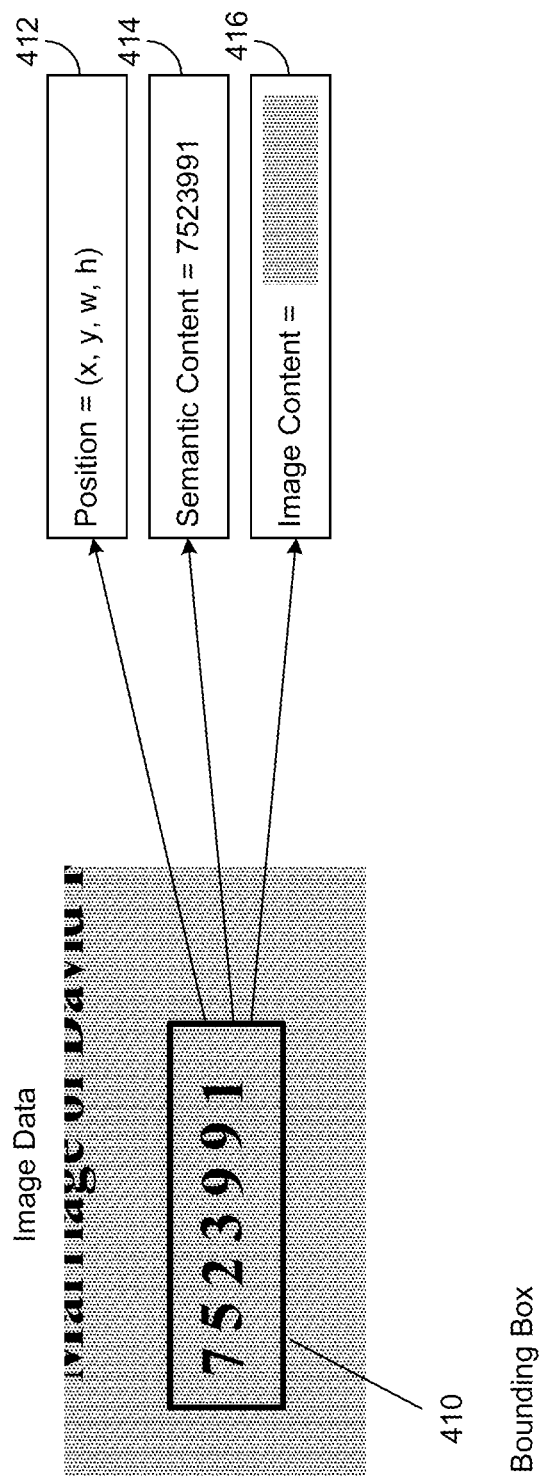
FIGS. 4A-4E are diagrams illustrating processes of training a machine learning model to convert a bounding box into vector space according to example embodiments.
Figure 4B:
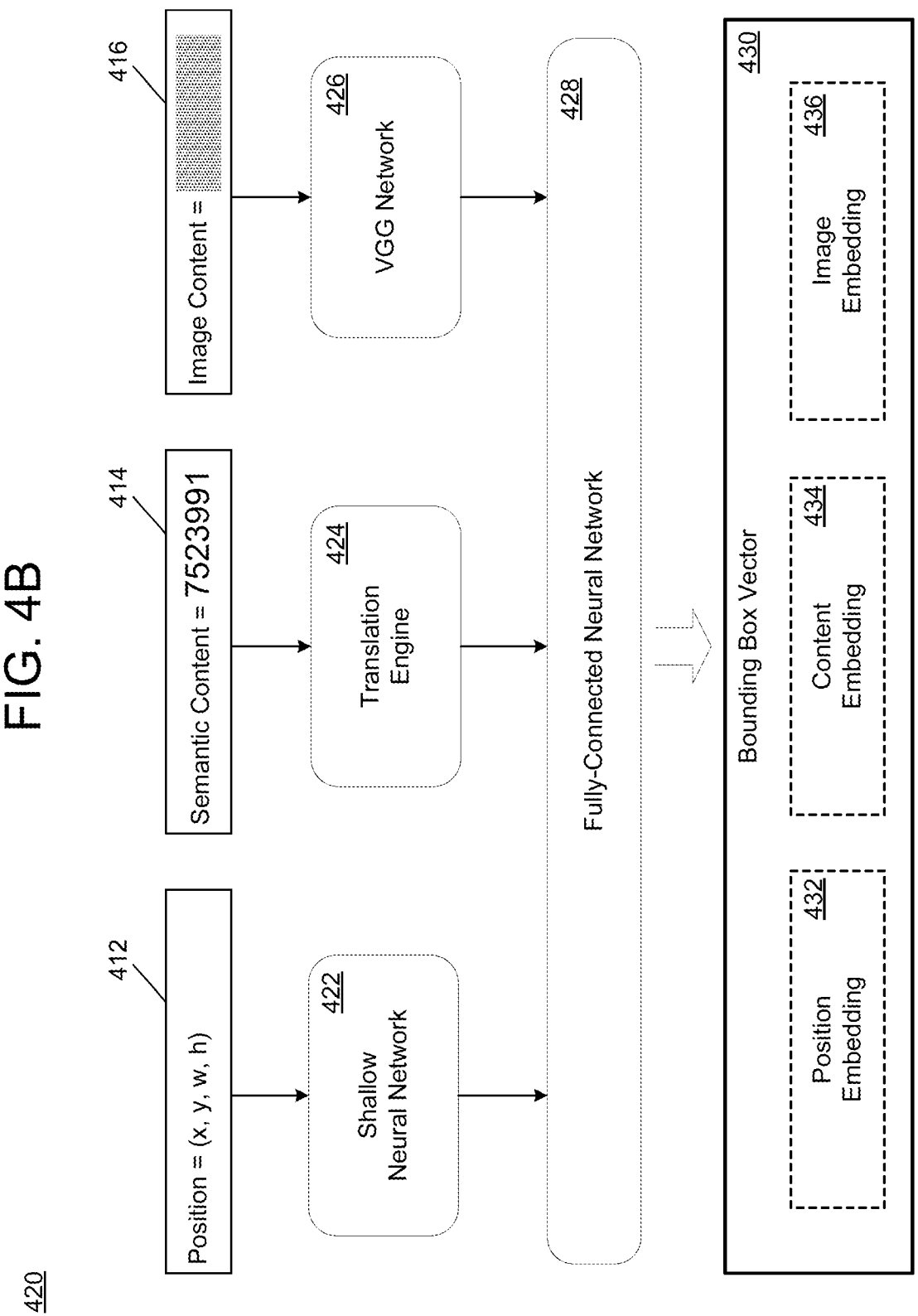
Figure 4C:
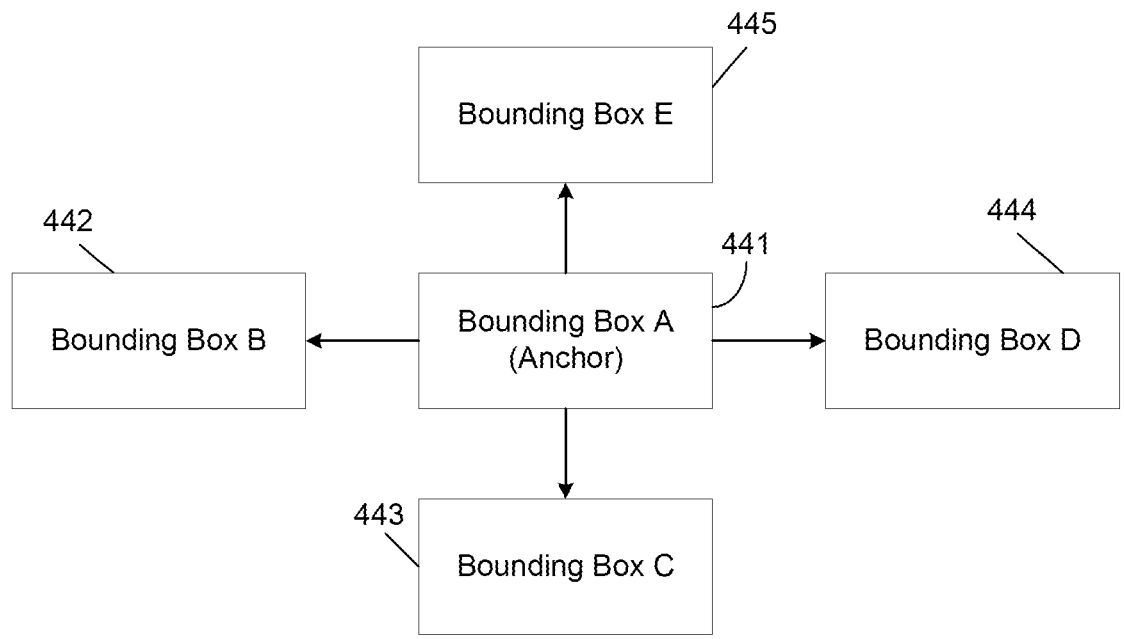
Figure 4D:
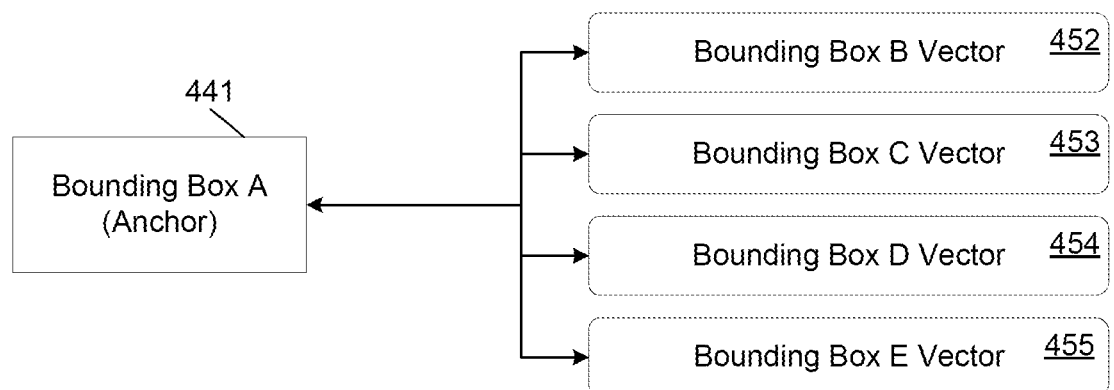
Figure 4E:
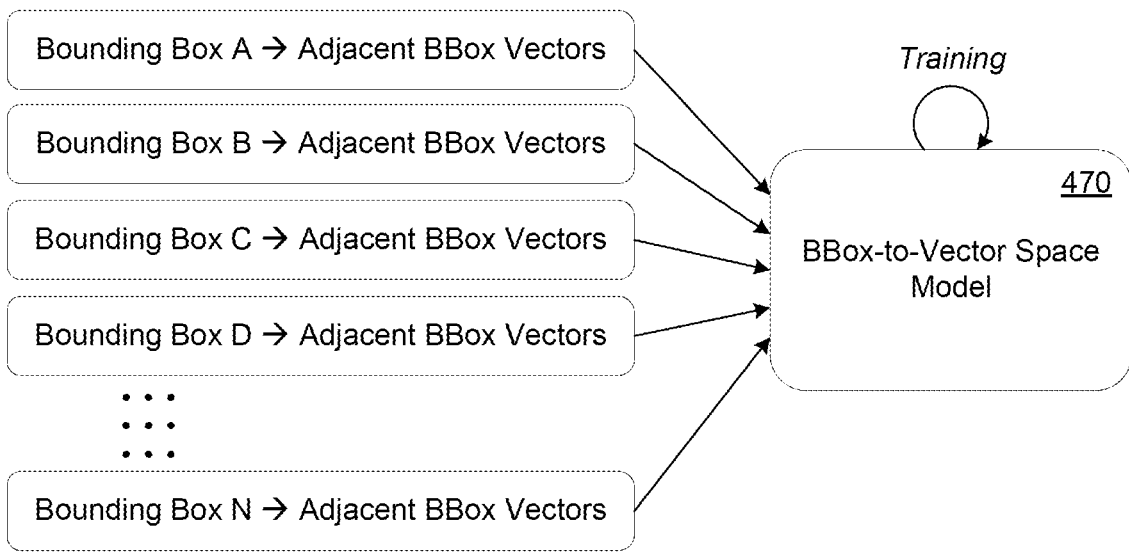
Figure 4F:
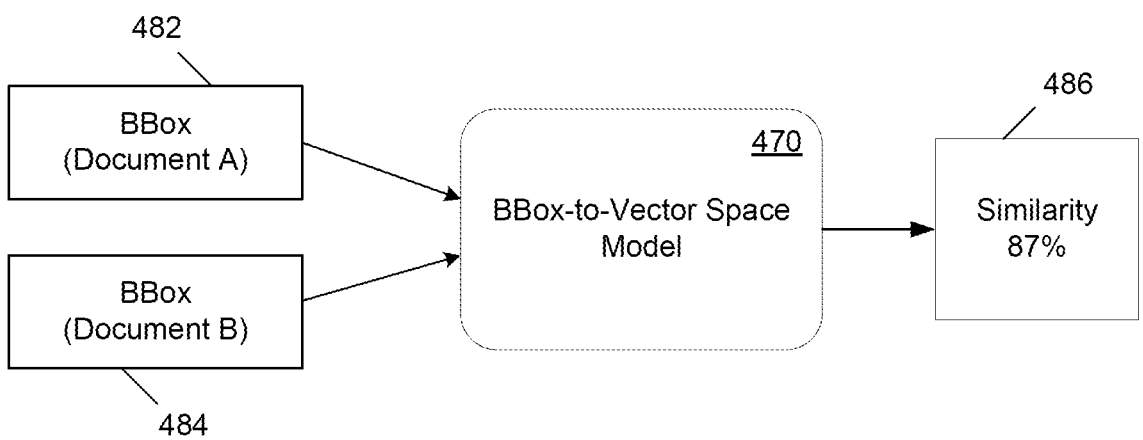
FIG. 4F is a diagram illustrating a process of determining a similarity between two documents via executing of the machine learning model trained in FIGS. 4A-4E, according to an example embodiment.

FIGS. 4A-4E illustrate processes of training a machine learning model to convert a bounding box into vector space according to example embodiments, and FIG. 4F illustrates a process of determining a similarity between two documents via executing of the machine learning model trained in FIGS. 4A-4E, according to an example embodiment. In the example embodiments, the host platform may self-train a machine learning model to compare bounding boxes within two or more different documents/images in vector space. The host platform may then input various fields from any of the documents into the trained model to identify whether the fields are directed to the same content.

For example, FIG. 4A illustrates a process 400 of setting a bounding box 410 within an image, for example, an image of a document such as an invoice, a sales order, a bill, a receipt, and the like. In some embodiments, the bounding box may be used to represent the position of a text region in the document such as a word, a number, a string, or the like, of alphanumeric characters. In other words, the host may use the text regions as the minimum granularity of the bounding box. The position of the bounding box may be used as part of the training data to help train a machine learning model. In addition to the position of the text area, the text content and image information in this text area will be introduced into the machine learning model. After the model is trained, the model can be used to encode the corresponding image regions, make them into embeddings, and use the embeddings to calculate regions in the image that have the same or similar meaning.

In the example of FIG. 4A, the host may extract attributes 412, 414, and 416 from the bounding box 410. In this example, the bounding box 410 comprises a size of a width (w) and a height (h), at an x and y coordinate location in the image/pixel coordinate system. Here, the host platform may extract position information 412 of the bounding box 410 within the image. The position information 412 may include the width (w) and height (h) of the bounding box 410 and/or the coordinate locations (x, y) of the bounding box 410 within the image. The host may also recognize semantic content 414 including the alphanumeric characters inside of the bounding box 410, and a background image 416 of the bounding box 410.

FIG. 4B illustrates a process 420 of encoding the attributes 412, 414, and 416 into a vector, referred to herein as a bounding box vector 430. The encoding process fuses together multiple modes of information including bounding box position within the image, alphanumeric content from within the bounding box, and an image background content from within the bounding box into the bounding box vector 430. The encoding process may be performed for many bounding boxes in multiple documents. After the encoding is performed, each bounding box is encoded into a bounding box vector as an input for the next step.

During the encoding process, the position information 412 can be processed via a neural network, such as a fixed shallow neural network 422, to generate an N-dimensional vector. This step does not require training and is essentially a dimension-up operation. For example, the shallow neural network 422 may encode sparse, low-dimensional location data into high-dimensional, dense vectors. This step is to upscale the previous low-dimensional position data (x, y, w, h) into a vector of many dimensions (e.g., 300, etc.), so that it is in the same dimension as the text vector and image vector. It is also convenient for subsequent vector connection operations.

For the alphanumeric/text included in the semantic content 414, the host may encode the text information through a Sequence to Sequence (Seq2Seq) translation engine 424 for semantic vector encoding. The translation engine 424 may contain hidden layer vector information in multiple languages. It can represent the semantic information in multiple modalities (such as English date and Chinese date, etc.) Furthermore, the background image information 416 can be separated from the bounding box, and passed through a neural network such as a Visual Geometry Group (VGG) Network 426. Here, the background image may be separated from the alphanumeric content such that only the background image is input to the VGG network 426 without the alphanumeric content. The outputs of the fixed shallow neural network 422, the translation engine 424, and the VGG network 426 may be concatenated together and embedded within the bounding box vector 430, for example, via a neural network such as a fully-connected neural network.

FIG. 4C illustrates a process 440 of determining context associated with a target bounding box, which in this example is an anchor bounding box 441 within an image. The example embodiments may use a model based on the concept of a continuous bag of words (CBOW) model and use the context of a specific bounding box to predict the embedding of the bounding box. For example, the host platform may use the surrounding bounding boxes as the context of the anchor bounding box 441. Here, the host may select the nearest bounding box in one or more directions, for example, four directions such as a bounding box 442 to the left of the anchor bounding box 441, a bounding box 443 below the anchor bounding box 441, a bounding box 444 to the right of the anchor bounding box 442, and a bounding box 445 disposed above the anchor bounding box 441, as the "context". In some cases, such as text on the edges of the document, may not have bounding boxes in four different directions, but only three or less which can be used to represent the anchor bounding box.

FIG. 4D illustrates a process 450 of generating a mapping between the anchor bounding box 441 and bounding box vectors 452, 453, 454, and 455 of the surrounding/adjacent bounding boxes 442, 443, 444, and 445 identified in the process of FIG. 4C. Here, the host may concatenate the bounding box vectors 452, 453, 454, and 455 into another vector and store a mapping of the bounding box 441 to the concatenated bounding box vectors 452, 453, 454, and 455. This process may be repeated for bounding boxes in the images which create a training data set for training a machine learning model.

FIG. 4E illustrates a process 460 of training a machine learning model 470 based on a plurality of bounding box mappings such as those created by the process of FIG. 4D. In this example, the host may use the mappings between the anchor bounding box and the contextual bounding boxes to train the machine learning model 470. The machine learning model 470 may be trained until a convergence is reached or some other desired optimization. The machine learning model 470 may be referred to as a Bounding Box to Vector (BBox2Vec) machine learning model that is configured to map a bounding box into vector space based on attributes of the bounding box (e.g., position, semantic content, background image, etc.).

FIG. 4F illustrates a process 480 of determining that two bounding boxes 482 and 484 from two different documents (not shown) correspond to the same content. Here, the bounding boxes 484 and 484 may be input to the trained machine learning model 470. Here, the trained machine learning model 470 may convert the bounding box into a location in vector space based on the attributes of the bounding box, such as the position, semantic content, and background image. Locations of the two vectors in vector space that represent the bounding boxes 482 and 484 can be compared to identify whether the content is similar. For example, the spatial distances between bounding boxes with similar business meanings may be smaller than a predefined distance in vector space. The host can use this predefined distance to determine whether the vector representation of two bounding boxes generated by the trained machine learning model 470 are within a close enough distance to each other in vector space to be considered the same content.

In addition to the above-mentioned vector-based template matching method, the trained machine learning algorithm 470 can also solve ambiguity problems for optical character recognition (OCR) scenarios. For example, the trained machine learning model 470 may dynamically generate a vector corresponding to a field in a multi-modal manner according to the context in which the field is located, and perform matching judgments.

FIG. 5 illustrates a method 500 of training a machine learning model to transform a bounding box into a vector according to an example embodiment. For example, the method 500 may be performed by a computer system such as a cloud platform, a web server, a personal computer or other user device, and the like. Referring to FIG. 5, in 510 the method may include generating a plurality of bounding boxes at a plurality of content areas in an image corresponding to a plurality of pieces of text within the image. For example, the plurality of bounding boxes may be arranged around a plurality of pieces of alphanumeric content in the document.

In 520, the method may include converting the plurality of bounding boxes into a plurality of bounding box vectors based on attributes of the plurality of bounding boxes. In 530, the method may include training a machine learning model to transform a bounding box into a location in vector space based on the plurality of bounding box vectors. In 540, the method may include storing the trained machine learning model in memory.

In some embodiments, the method may further include determining whether a first document and a second document comprise common content via execution of the trained machine learning model on bounding box data extracted from the first and second documents.

In some embodiments, the converting may include extracting a pixel position of a respective bounding box from the image and encoding the pixel position into a respective bounding box vector for the respective bounding box. In some embodiments, the converting comprises extracting a string of alphanumeric characters of a respective bounding box and encoding the string of alphanumeric characters into a respective bounding box vector for the respective bounding box. In some embodiments, the converting may include extracting a background image of a respective bounding box from the image and encoding the background image into a respective bounding box vector for the respective bounding box.

In some embodiments, the training may include training the machine learning model based on context associated with the plurality of bounding boxes. In some embodiments, the training may include selecting an anchor bounding box, identifying a plurality of bounding boxes that are adjacent to the anchor bounding box in a plurality of different directions, respectively, and training the machine learning model based on a mapping between the anchor bounding box and the plurality of bounding boxes that are adjacent to the anchor bounding box. In some embodiments, the method may further include extracting a first bounding box from a first image and a second bounding box from a second image, and determining, via execution of the trained machine learning model, that the first bounding box and the second bounding box correspond to a same field in a document.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
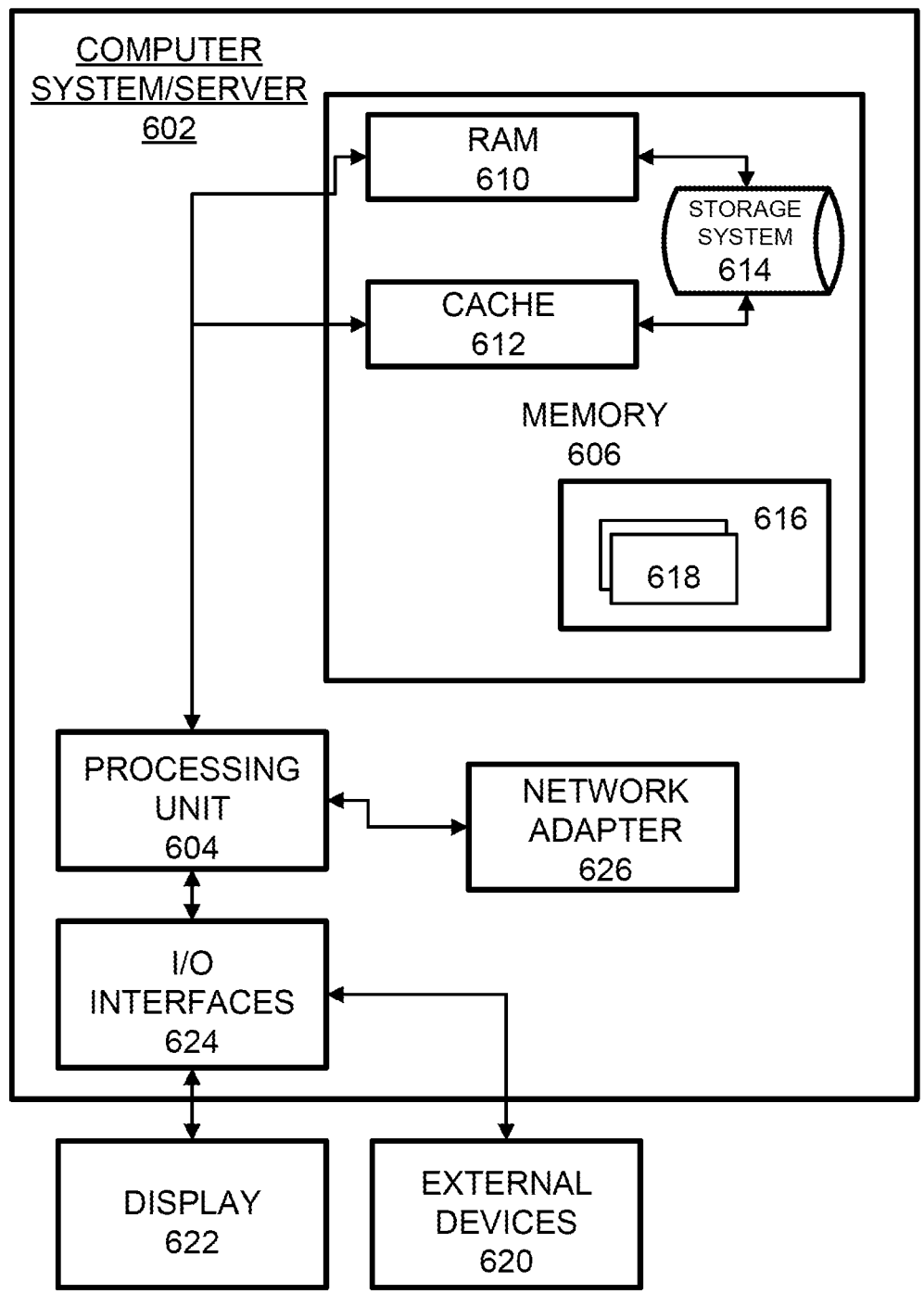
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus, comprising:
a processor that, when executing instructions stored in a memory, is configured to:
generate a plurality of bounding boxes at a plurality of content areas in an image, wherein the plurality of bounding boxes correspond to a plurality of pieces of text within the image;
convert the plurality of bounding boxes into a plurality of bounding box vectors based on attributes of the plurality of bounding boxes;
select a bounding box of the plurality of bounding boxes as an anchor bounding box;
identify bounding boxes that are adjacent to the anchor bounding box;
concatenate bounding box vectors corresponding to the bounding boxes, that are adjacent to the anchor bounding box, into a concatenated bounding box vector;
store a mapping between the anchor bounding box and the concatenated bounding box vector;
train a machine learning model to create a trained machine learning model to transform a bounding box into a location in vector space based on mappings, including the concatenated bounding box vector; and
store the machine learning model in the memory.

2. The apparatus of claim 1, wherein the processor is configured to:
determine whether a first document and a second document comprise common content via execution of the trained machine learning model on bounding box data extracted from the first and second documents.

3. The apparatus of claim 1, wherein the processor is configured to:
extract a pixel position of a respective bounding box from the image and encode the pixel position into a respective bounding box vector for the respective bounding box.

4. The apparatus of claim 1, wherein the processor is configured to:
extract a string of alphanumeric characters of a respective bounding box and encode the string of alphanumeric characters into a respective bounding box vector for the respective bounding box.

5. The apparatus of claim 1, wherein the processor is configured to:
extract a background image of a respective bounding box from the image and encode the background image into a respective bounding box vector for the respective bounding box.

6. The apparatus of claim 1, wherein the processor is configured to:
train the machine learning model based on context associated with the plurality of bounding boxes.

7. The apparatus of claim 1, wherein the processor is further configured to:
extract a first bounding box from a first image and a second bounding box from a second image, and determine, via execution of the trained machine learning model, that the first bounding box and the second bounding box correspond to a same field in a document.

8. A method comprising:
generating a plurality of bounding boxes at a plurality of content areas in an image, wherein the plurality of bounding boxes correspond to a plurality of pieces of text within the image;
converting the plurality of bounding boxes into a plurality of bounding box vectors based on attributes of the plurality of bounding boxes;
selecting a bounding box of the plurality of bounding boxes as an anchor bounding box;
identifying bounding boxes that are adjacent to the anchor bounding box;
concatenating bounding box vectors corresponding to the bounding boxes, that are adjacent to the anchor bounding box, into a concatenated bounding box vector;
storing a mapping between the anchor bounding box and the concatenated bounding box vector;
training a machine learning model to create a trained machine learning model transform a bounding box into a location in vector space based on mappings, including the concatenated bounding box vector-; and
storing the trained machine learning model in memory.

9. The method of claim 8, wherein the method further comprises:
determining whether a first document and a second document comprise common content via execution of the trained machine learning model on bounding box data extracted from the first and second documents.

10. The method of claim 8, wherein the converting comprises:
extracting a pixel position of a respective bounding box from the image and encoding the pixel position into a respective bounding box vector for the respective bounding box.

11. The method of claim 8, wherein the converting comprises:
extracting a string of alphanumeric characters of a respective bounding box and encoding the string of alphanumeric characters into a respective bounding box vector for the respective bounding box.

12. The method of claim 8, wherein the converting comprises:
extracting a background image of a respective bounding box from the image and encoding the background image into a respective bounding box vector for the respective bounding box.

13. The method of claim 8, wherein the training comprises:
training the machine learning model based on context associated with the plurality of bounding boxes.

14. The method of claim 8, wherein the method further comprises:
extracting a first bounding box from a first image and a second bounding box from a second image, and determining, via execution of the trained machine learning model, that the first bounding box and the second bounding box correspond to a same field in a document.

15. A non-transitory computer-readable storage medium comprising instructions that, when executed by a processor, cause the processor to perform:
generating a plurality of bounding boxes at a plurality of content areas in an image, wherein the plurality of bounding boxes correspond to a plurality of pieces of text within the image;
converting the plurality of bounding boxes into a plurality of bounding box vectors based on attributes of the plurality of bounding boxes;
selecting a bounding box of the plurality of bounding boxes as an anchor bounding box;
identifying bounding boxes that are adjacent to the anchor bounding box;
concatenating bounding box vectors corresponding to the bounding boxes, that are adjacent to the anchor bounding box, into a concatenated bounding box vector;
storing a mapping between the anchor bounding box and the concatenated bounding box vector;
training a machine learning model to create a trained machine learning model transform a bounding box into a location in vector space based on mappings, including the concatenated bounding box vector; and
storing the trained machine learning model in memory.

16. The non-transitory computer-readable storage medium of claim 15, wherein the instructions further cause the processor to perform:
determining whether a first document and a second document comprise common content via execution of the trained machine learning model on bounding box data extracted from the first and second documents.

17. The non-transitory computer-readable storage medium of claim 15, wherein the converting comprises:
extracting a pixel position of a respective bounding box from the image and encoding the pixel position into a respective bounding box vector for the respective bounding box.

18. The non-transitory computer-readable storage medium of claim 15, wherein the converting comprises:
extracting a string of alphanumeric characters of a respective bounding box and encoding the string of alphanumeric characters into a respective bounding box vector for the respective bounding box.

* * * * *